(12) United States Patent  (10) Patent No.: US 8,351,713 B2
Sun et al.                  (45) Date of Patent:     Jan. 8, 2013

(54) DRAG-AND-DROP PASTING FOR SEAMLESS IMAGE COMPOSITION

(75) Inventors: Jian Sun, Beijing (CN); Jiaya Jia, Kowloon (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1015 days.

(21) Appl. No.: 11/676,806

(22) Filed: Feb. 20, 2007

(65) Prior Publication Data

US 2008/0198175 A1 Aug. 21, 2008

(51) Int. Cl.
G06K 9/36 (2006.01)
(52) U.S. Cl. ........ 382/232; 382/264; 382/284; 382/173; 348/586; 348/589; 348/597; 348/584
(58) Field of Classification Search .................. 382/260, 382/275, 205, 174, 284; 345/582, 583, 585, 345/587, 588, 629, 552, 584, 630, 640; 348/586, 348/598, 597, 590, 578, 584
See application file for complete search history.

(56) References Cited

U.S. PATENT DOCUMENTS

| 5,289,570 | A | 2/1994 | Suzuki |
| 5,442,739 | A | 8/1995 | Saito |
| 5,995,115 | A | 11/1999 | Dickie |
| 6,081,818 | A | 6/2000 | Shieh |
| 6,337,925 | B1 | 1/2002 | Cohen et al. |
| 6,469,710 | B1 * | 10/2002 | Shum et al. .................. 345/619 |
| 6,535,230 | B1 | 3/2003 | Celik |
| 6,856,705 | B2 * | 2/2005 | Perez et al. .................. 382/264 |
| RE38,883 | E | 11/2005 | Wyard |
| 7,003,161 | B2 | 2/2006 | Tessadro |
| 7,239,805 | B2 * | 7/2007 | Uyttendaele et al. ......... 396/222 |

(Continued)

FOREIGN PATENT DOCUMENTS

EP  0660220  6/1995

(Continued)

OTHER PUBLICATIONS

Li et al.,"Poisson Image Editing Method Preserving Object Colors", published on Dec. 2006, URL: <http://magic.ssu.ac.kr/07_magic/img/publications/PIEM_PUB.pdf>, published on Dec. 2006, and <http://magic.ssu.ac.kr/07_magic/img/publications/SIM_COLOR_APIS06.pdf>, pp. 12.*

(Continued)

*Primary Examiner* — Matthew Bella
*Assistant Examiner* — Mekonen Bekele
(74) *Attorney, Agent, or Firm* — Lee & Hayes, PLLC

(57) ABSTRACT

Systems and methods provide drag-and-drop pasting for seamless image composition. In one implementation, a user casually outlines a region of a source image that contains a visual object to be pasted into a target image. An exemplary system automatically calculates a new boundary within this region, such that when pasted at this boundary, visual seams are minimized. The system applies a shortest path calculation to find the optimal pasting boundary. The best path has minimal color variation along its length, thus avoiding structure and visual objects in the target image and providing the best chance for seamlessness. Poisson image editing is applied across this optimized boundary to blend colors. When the visual object being pasted has fine structure at its border that could be truncated by the Poisson editing, the exemplary system integrates the alpha matte of the visual object into the Poisson equations to protect the fine structure.

18 Claims, 8 Drawing Sheets

U.S. PATENT DOCUMENTS

| | | | |
|---|---|---|---|
| 7,427,994 B2 * | 9/2008 | Gangnet et al. | 345/606 |
| 7,502,499 B2 * | 3/2009 | Grady | 382/128 |
| 7,589,720 B2 * | 9/2009 | Zhou et al. | 345/423 |
| 7,605,821 B1 * | 10/2009 | Georgiev | 345/582 |
| 7,636,128 B2 * | 12/2009 | Sun et al. | 348/586 |
| 7,681,134 B1 * | 3/2010 | Grechishkin et al. | 715/740 |
| 2005/0180635 A1 | 8/2005 | Trifonov et al. | |
| 2005/0237341 A1 * | 10/2005 | Gangnet et al. | 345/606 |
| 2006/0177150 A1 * | 8/2006 | Uyttendaele et al. | 382/284 |
| 2007/0013813 A1 * | 1/2007 | Sun et al. | 348/587 |
| 2009/0022419 A1 * | 1/2009 | Molnar et al. | 382/275 |
| 2009/0129700 A1 * | 5/2009 | Rother et al. | 382/284 |

FOREIGN PATENT DOCUMENTS

| | | | |
|---|---|---|---|
| EP | 1748389 A1 * | 1/2007 | |

OTHER PUBLICATIONS

Sun et al. "Poisson Matting", ACM publicatiion, published 2004, p. 315-321.*

Li et al.,"Poisson Image Editing Method Preserving Object Colors", published on Dec. 2006, URL: /magic.ssu.ac.kr/O7_magic/img/publications/PIEM_PUB.pdf>, published on Dec. 2006, and /magic.ssu.ac.kr/O7_magic/img/publications/SIM_COLOR_APISO6.pdf >, pp. 12.*

David Jacobs, "Lecture note in Image Processing CMSC 426", published in Fall 2005< http://www.cs.umd.edu/~djacobs/CMSC426/CMSC426_05.htm >, pp. 1/7-2/7 and 1-16.*

Perez et al., "Poisson Image editing", and ACM Transactions on Graphics (TOG), published on Jul. 2003, pp. 313-331.*

Sun et al. "Poisson Matting", ACM publicatiion, published 2004, p. 315-321.*

Li et al.,"Poisson Image Editing Method Preserving Object Colors", published on Dec. 2006, pp. 12.*

Sun et al. "Poisson Matting", ACM publication, published 2004, p. 315-321.*

Perez et al., "Poisson Image editing", and ACM Transactions on Graphics (TOG), published on Jul. 2003, pp. 313-317.*

Jia et al.(hereafter Jia), "Drag-and-Drop Pasting", published on Jul. 3, 2006, ACM Transactions on Graphics (TOG)—Proceedings of ACM SIGGRAPH 2006, pp. 631-636.*

Mortensen, et al., "A Confidence Measure for Boundary Detection and Object Selection" Available at http://ieeexplore.ieee.org/jel5/7768/21353/00990513.pdf?tp=&arnumber=990513&isnumber=21353, Dec. 14, 2001, pp. 8.

Mortensen, at al., "Intelligent Scissors for Image Composition" Available at http://delivery.acm.org/10.1145/220000/218442/p191-mortensen.pdf?key1=218442&key2=4299289411&coll=GUIDE&dl=GUIDE&CFID=73185672&CFTOKEN=82052446, 1995, pp. 191-198.

Seitz, et al , "Plenoptic Image Editing" Available at http://ieeexplore.ieee.org/iel4/5756/15374/00710696.pdf?tp&arnumber=710696&isnumber=15374, Jan. 1997 pp. 5-6.

Jia et al., "Drag-and-Drop Pasting", ACM Transactionson Graphics (TOG), vol. 25, Iss. 3, Jul. 2006, pp. 631-636.

* cited by examiner

DRAG-AND-DROP PASTING FOR SEAMLESS IMAGE COMPOSITION

BACKGROUND

Image composition is an important tool for digital image editing. Applications include cutting and pasting selected objects from one image to another and background replacement for selected objects, using such techniques as Poisson editing. For Poisson image editing to work satisfactorily, the user must carefully trace an accurate boundary exactly outlining the source object, so that salient structures in source and target images do not conflict with each other along the pasting boundary. Then, by solving Poisson equations using the user-specified boundary condition, Poisson image editing seamlessly blends the colors from both images, hopefully without visible discontinuities near the boundary.

The effectiveness of Poisson image editing, however, depends on how carefully the user draws the boundary outlining the object to be pasted. Thus, Poisson image editing may not always produce good results. If the outline of the object is only casually drawn by the user, the Poisson image editing may generate unnatural blurring artifacts at places where the boundary intersects with salient structures in the target image. What is needed is a way to obtain seamless composition even when the user only casually designates the general region that contains the object to be pasted.

SUMMARY

Systems and methods provide drag-and-drop pasting for seamless image composition. In one implementation, a user casually outlines a region of a source image that contains a visual object to be pasted into a target image. An exemplary system automatically calculates a new boundary within this region, such that when pasted at this boundary, visual seams are minimized. The system applies a shortest path calculation to find the optimal pasting boundary. The best path has minimal color variation along its length, thus avoiding structure and visual objects in the target image and providing the best chance for seamlessness. Poisson image editing is applied across this optimized boundary to blend colors. When the visual object being pasted has fine structure at its border that could be truncated by the Poisson editing, the exemplary system integrates the alpha matte of the visual object into the Poisson equations to protect the fine structure.

This summary is provided to introduce exemplary drag-and-drop pasting for seamless image composition, which is further described in the Detailed Description. This summary is not intended to identify essential features of the claimed subject matter, nor is it intended for use in determining the scope of the claimed subject matter.

DETAILED DESCRIPTION

Overview

Figure 1:
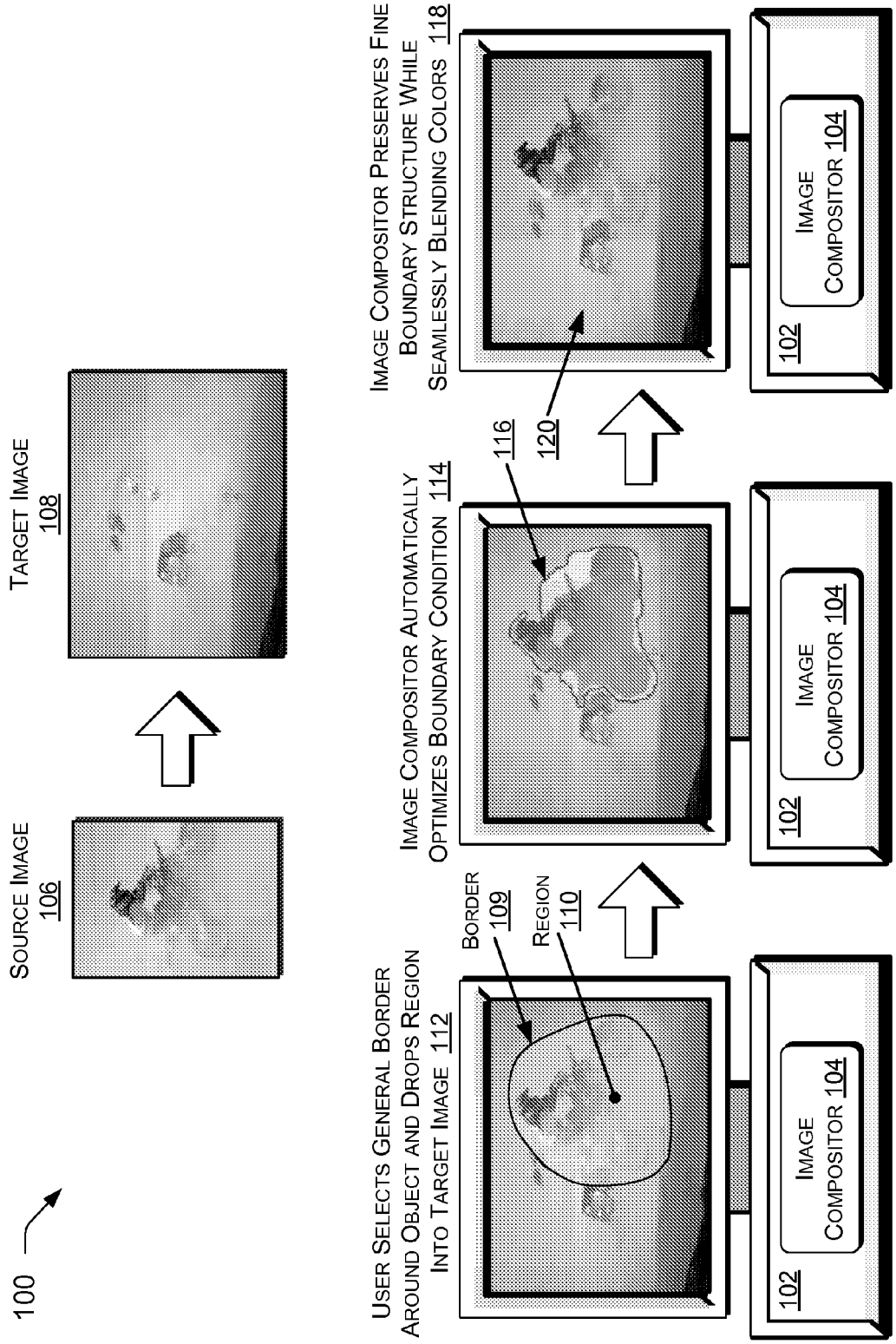
FIG. 1 is a diagram of an exemplary drag-and-drop pasting system for seamless image composition.

Described herein are systems and methods for drag-and-drop pasting that can provide relatively seamless image composition. To make Poisson image editing more practical and easy to use, an exemplary system uses a new objective function to compute an optimized boundary condition. A shortest closed-path technique is designed to search for an optimal location ("path") for the boundary between pasted region and the target image. Moreover, to faithfully preserve fine detail on an object's external border, the exemplary system can construct a blended guidance field to incorporate the object's alpha matte during Poisson editing. To use the exemplary system, the user simply outlines a region of interest in the source image that contains a visual object to be pasted, and then drags and drops the region onto the target image at the desired location. Experimental results demonstrate the effectiveness of such an exemplary "drag-and-drop pasting" system.

"Seamless," as used herein, means that the visibility of seams (pixel boundaries), i.e., the "fusion boundary" between a visual object being pasted and the target image, is minimized—the visibility of the fusion boundary between source object and target image is reduced over conventional cut-and-paste techniques. The exemplary systems and methods described herein achieve this effect of reduced seam visibility automatically, freeing the user from the painstaking effort of manually excising a visual object to be pasted, as is required with conventional Poisson image editing.

Within the casually selected region of the source image, the exemplary system automatically calculates a "best" boundary around the object for pasting the object into the target image, such that calculated boundary avoids salient structure in source and target images. The exemplary system also aims to place the boundary along a color-neutral path where subtle and gentle transitions in the color of the pixels in the path—and on either side of the path—facilitate natural color blending. These features allow the exemplary drag-and-drop pasting methods to create image compositions in which visual objects appear to be seamlessly pasted into the target image and in compatible color, with minimal work on the user's part.

In one implementation, the exemplary system calculates optimal boundary conditions for pasting seamlessly by iteratively minimizing a boundary energy function, thus placing the boundary where the color transitions between pixels are smooth. Then Poisson editing blends the region inside the boundary—including the object—into the target image at the location designated by the user. The user can "drop" the selected region at the desired location in the target image and the exemplary system seamlessly pastes the object into the target image, automatically cropping the selected region and blending colors via the Poisson editing as appropriate.

When an object to be pasted has fine structure on its border (e.g., filaments, transparency, a visually diffuse or indefinite border, etc.—referred to herein as a "fractional border"), then sometimes the path of the optimal boundary can intersect and truncate the object's fractional border. The optimal boundary can sometimes cut off some of the object's fine detail. Therefore, the exemplary system controls the Poisson editing with a guidance field, which integrates the object's alpha matte into the Poisson editing when the object has such a fractional border. The guidance field specifies where (and where not) to perform alpha blending. The exemplary system then applies a smoothing function between those parts of the object's fractional border that have been subjected to alpha blending and the remaining parts that have not.

Thus, the exemplary system is flexible and capable of automatically pasting many types of visual objects into many challenging types of visual environments, while respecting the fine structure of visual objects that have fractional borders. Resulting image composites have vibrant detail, a seamless appearance, and have aesthetic color continuity across the final composited image.

Exemplary System

FIG. 1 shows an exemplary image compositing system 100. A computing device 102 hosts an exemplary image compositor 104. When a user wants to cut-and-paste a visual object from a source image 106 to a target image 108, the user can select a region 110 by casually drawing a border 109 around the visual object, and then dropping 112 [112?] the selected region 110 into a desirable location in the target image 108.

The exemplary image compositor 104 automatically optimizes the boundary condition 114 to find an optimal fusion boundary 116 between the target image 108 and the region being pasted (i.e., the region being pasted is that part of the user-selected region 110 enveloped by the optimal boundary 116). The image compositor 104 can preserve the fine detail or diffuse structure of a visual object that has an ambiguous, delicate, fractional border. The image compositor 104 applies exemplary guided-field Poisson image editing 118 to blend colors across the optimal boundary 116 with minimal visual seams, promulgating continuity and compatibility of colors across the target image 108 and the newly pasted region inside of optimized boundary 116. When the optimal boundary 116 intersects or gets too close to fine detail of the visual object's border, alpha blending is mapped into the Poisson editing method so that fine border structures are spared color averaging or color leveling processes. The resulting composite image 120 is aesthetically pleasing in that it appears subjectively seamless to the human eye and possesses compatible colors across the composite image 120, while fine border details of the pasted object (and also fine structural details in the target image 108) are preserved.

Exemplary Engine

Figure 2:
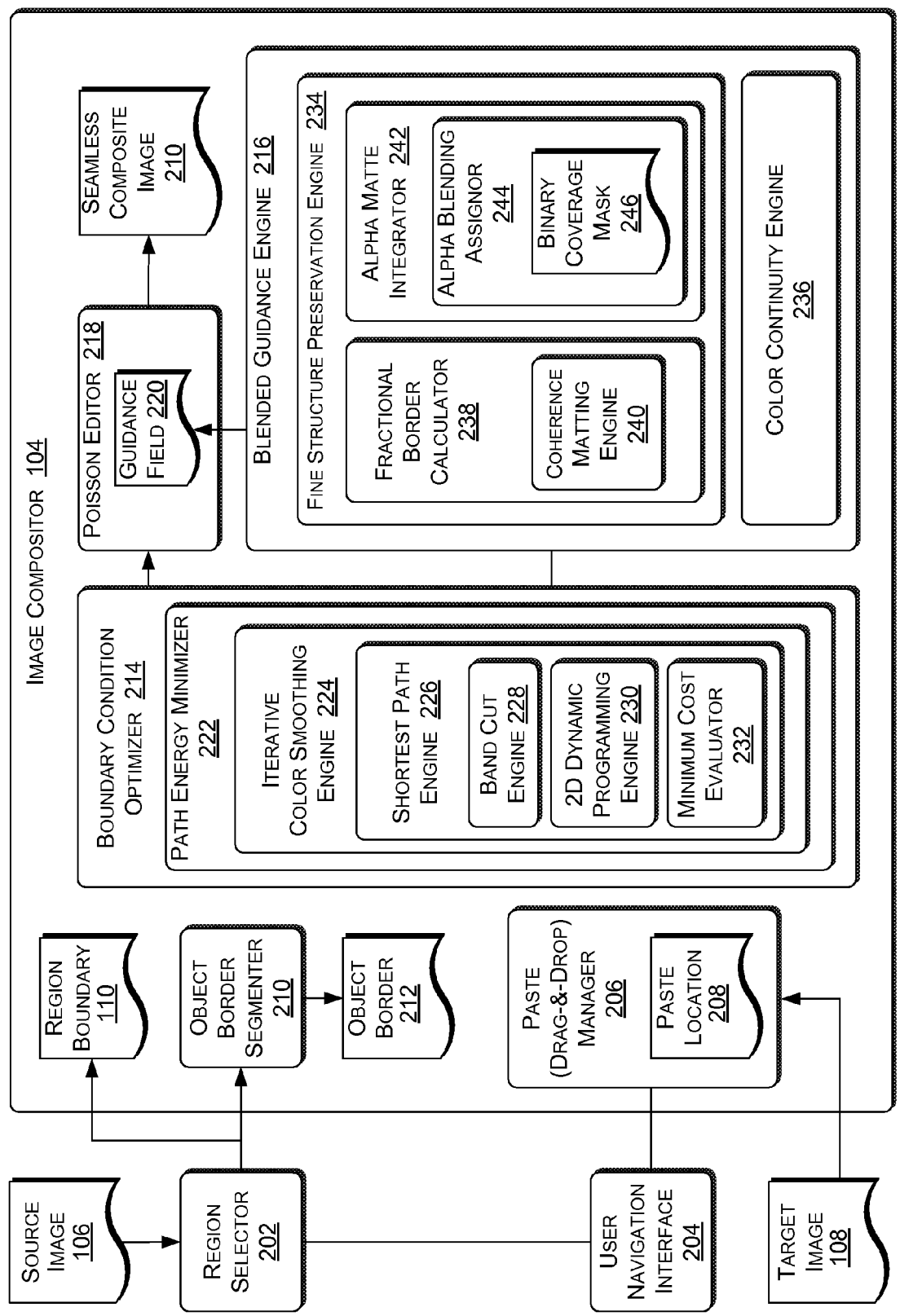
FIG. 2 is a block diagram of an exemplary image composition engine.

FIG. 2 shows the exemplary image compositor 104 of FIG. 1, in greater detail. The illustrated implementation is only one example configuration of components, for descriptive purposes. Many other implementations of the exemplary image compositor 104 are possible within the scope of the subject matter. The illustrated exemplary image compositor 104 can be executed in hardware, software, or combinations of hardware, software, firmware, etc. The various components will now be introduced, followed by a more detailed description of their operation.

The exemplary image compositor 104 includes components to obtain the selected region 110 from the source image 106, to determine the border of the visual object being pasted, and to determine the paste location 208 selected by the user within the target image 108. To select a general region 110 around a visual object from a source image 106, a user employs a region selector 202 associated with a user navigation interface 204. For example, the user may casually circumscribe the visual object by clicking and moving a mouse, or may designate the region 110 by drawing the arbitrary border 109 with a pen or tablet scribe, etc. The exemplary image compositor 104 includes a paste manager (drag-and-drop manager) 206 to track selection of the region 110 and keep track of the paste location 208 in the target image 108. The image compositor 104 also employs an object border segmenter 210 to determine the border 212 of the visual object being pasted. Known foreground segmenters, such as GRABCUT or LAZY SNAPPING, may be used as the object border segmenter 210.

Once the image compositor 104 has obtained the selected region 110, the border of the visual object being pasted, and the paste location 208, then the image compositor 104 performs the boundary optimization and image compositing. A boundary condition optimizer 214 determines the optimized fusion boundary 116, and a blended guidance engine 216 guides the Poisson image editor 218 via a guidance field 220, to create the seamless composite image 120. The color continuity engine 236 blends color transitions between areas of an object's fractional border subjected to alpha blending, and adjacent areas where alpha blending was not applied.

In one implementation, the boundary condition optimizer 214 further includes a path energy minimizer 222, an iterative boundary-color smoothing engine 224, and a shortest path engine 226. The shortest closed-path engine further includes a band cut engine 228, a 2D dynamic programming engine 230, and a minimum cost evaluator 232. In variations, however, other particular techniques may be used to optimize the boundary condition to determine an optimized fusion boundary 116.

In one implementation, the blended guidance engine 216 further includes a fine structure preservation engine 234 (to preserve a fractional border of the visual object being pasted) and a color continuity engine 236. The fine structure preservation engine 234 further includes a fractional border calculator 238 that may use a coherence matting engine 240. An alpha matte integrator 242 includes an alpha mapper, referred to as an alpha blending assignor 244, which produces a binary coverage mask 246 to map where to apply alpha blending within the object's fractional border.

In the above-described implementation, the exemplary image compositor 104 receives a target image 108 and a designated region 110 from a source image 106 as input, and provides the seamless composite image 120 as output. The exemplary image compositor 104 may exist in other forms. The implementation described herein is presented to facilitate description.

Operation of the Exemplary Engine

The boundary condition optimizer 214 executes an objective function by iterating a shortest closed-path technique. The path energy minimizer 222 searches for an optimal boundary path in-between the region's border 109 that the user has drawn (i.e., enveloping the selected region 110 of interest) and the border 212 of the visual object that the user wants to paste (the object of interest). Compared with conventional Poisson image editing, the exemplary image compositor 104 allows the user to easily drag the region of interest 110 from the source image 106 and to drop it onto the target image 108, without need for careful user specification of the optimal cut-and-paste boundary.

Often the new, optimized boundary 116 intersects the visual object of interest, as mentioned above. In such a case, fine structures of the object may be missing after blending with the target image 108 through Poisson equations. The blended guidance engine 216, however, introduces the blended guidance field 220 to integrate an alpha matte into the Poisson equations to faithfully preserve the fractional boundary of the object for a more natural composite image 120.

The boundary condition optimizer 214 optimizes for boundary energy based on the minimum-error property in solving Laplace equations. Since the boundary condition optimizer 214 uses iterative optimization, can produce smooth and natural blending results even when the source region 110 and the target images 108 are largely different in color and structure. The fine structure preservation engine 234 can handle fine and transparent structures in solving the Poisson equations.

Exemplary Boundary Condition Optimizer

To paste the region of interest 110 from the source image $f_s$ 106 to the target image $f_t$ 108, the following minimization problem is solved using the guidance field 220: $v=f_s$ given the boundary condition defined on the user-drawn region of interest $\Omega_0$ 110, as in Equation (1):

$$\min_f \int_{p \in \Omega_0} |\nabla f - v|^2 dp \quad (1)$$

with $$f|_{\partial \Omega_0} = f_i|_{\partial \Omega_0},$$

where f is the resulting image, and $\partial \Omega_0$ is the exterior border 109 of the user-selected region $\Omega_0$ 110. The boundary condition optimizer 214 denotes $f'=f-f_s$. Since the guidance field 220 ($v=f_s$) is a gradient field, Equation (1) can be written as shown in Equation (2):

$$\min_{f'} \int_{p \in \Omega_0} |\nabla f'|^2 dp \quad (2)$$

with $$f'|_{\partial \Omega_0} = (f_i - f_s)|_{\partial \Omega_0}.$$

In one implementation, the associated Laplace equation is that of Equation (3):

$$\Delta f = 0 \text{ with } f'|_{\partial \Omega_0} = (f_i - f_s)|_{\partial \Omega_0}, \quad (3)$$

where $$\Delta = \left( \frac{\partial^2}{\partial x^2} + \frac{\partial^2}{\partial y^2} \right)$$

is the Laplacian operator and f' is a membrane interpolation inside $\Omega_0$ for the boundary condition $ft-fs|_{\partial \Omega_0}$. Equation (3) is simply a different interpretation of Poisson image editing by solving alternative Laplacian equations instead of Poisson equations.

Figure 3:
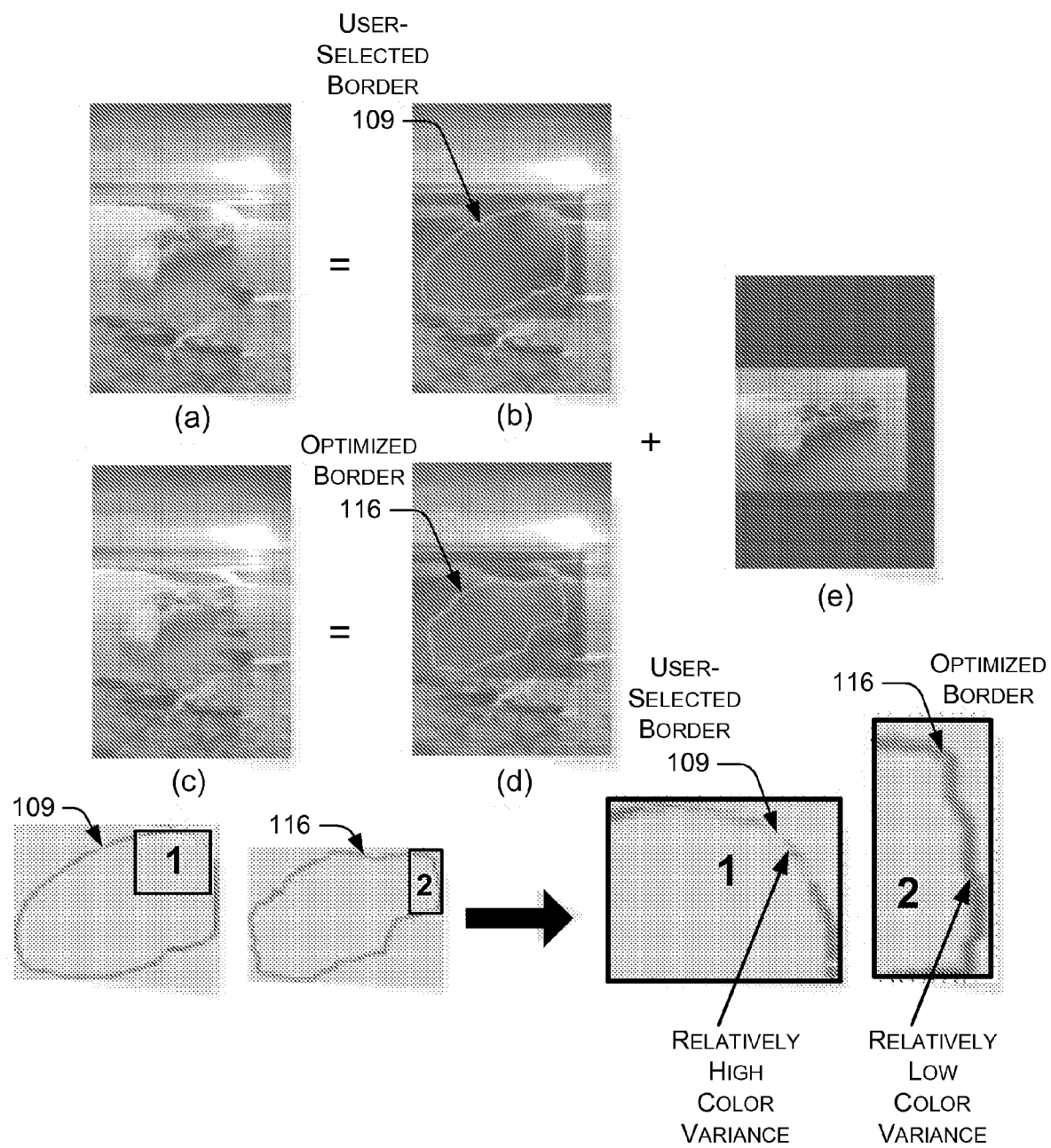
FIG. 3 is diagram of exemplary boundary optimization.

FIG. 3 shows a comparison of boundary conditions. FIGS. 3(a) and 3(c) are results obtained by solving Poisson equations with different boundary conditions. FIGS. 3(a) and 3(c) are also equivalent to adding FIGS. 3(b) and 3(d), respectively, to the source image $f_s$ 106 shown in FIG. 3(e). FIGS. 3(b) and 3(d) are results obtained by solving corresponding Laplace equations. The bottom row of images in FIG. 3 shows the boundaries from FIGS. 3(b) and 3(d). The color variance along boundary 2 is smaller than that along boundary 1.

As illustrated in the images of FIG. 3, the result from Poisson image editing FIG. 3(a) can be obtained by first solving the corresponding Laplacian equations using the boundary condition $(f_t-f_s)|_{\partial \Omega_0}$ in FIG. 3(b), and then adding back the original source image 106, in FIG. 3(e). Similarly, with a different boundary condition, image FIG. 3(c) can be obtained from FIG. 3(d) and FIG. 3(e).

Equation (2) leads to the following important property. The variational energy $\int \Omega_0 |\nabla f'|^2$ approaches zero if and only if all boundary pixels satisfy $ft-fs|_{\partial \Omega_0}=k$, where k is a constant value. In other words, the membrane interpolation is constant if and only if the boundary condition is constant.

As illustrated in FIG. 3, the boundary conditions $ft-fs|_{\partial \Omega_0}$ determine the final results. At the bottom left of FIG. 3, the images show the color difference between the source image 106 and the target image 108, $f_t-f_s$, along the user-drawn border $\partial \Omega_0$ 109 and the new boundary $\partial \Omega$ 116. From the zoomed-in views at the bottom right of FIG. 3, it can be observed that pixel colors along the new boundary $\partial \Omega$ 116 have much less variation than those along the user-drawn border $\partial \Omega_0$ 109. A smoother boundary condition produces smaller variational energy in solving the Laplacian equations, and thus improves the quality of the resulting composite image 120.

Thus, once the region border 109 and the object border 212 are determined, the next goal is for the boundary condition optimizer 214 to construct a color-smooth boundary condition $(f_t-f_s)|_{\partial \Omega}$ in the region $\Omega_0 \backslash \Omega_{obj}$, where optimized boundary $\partial \Omega$ 116 is a closed boundary to be estimated.

Figure 4:
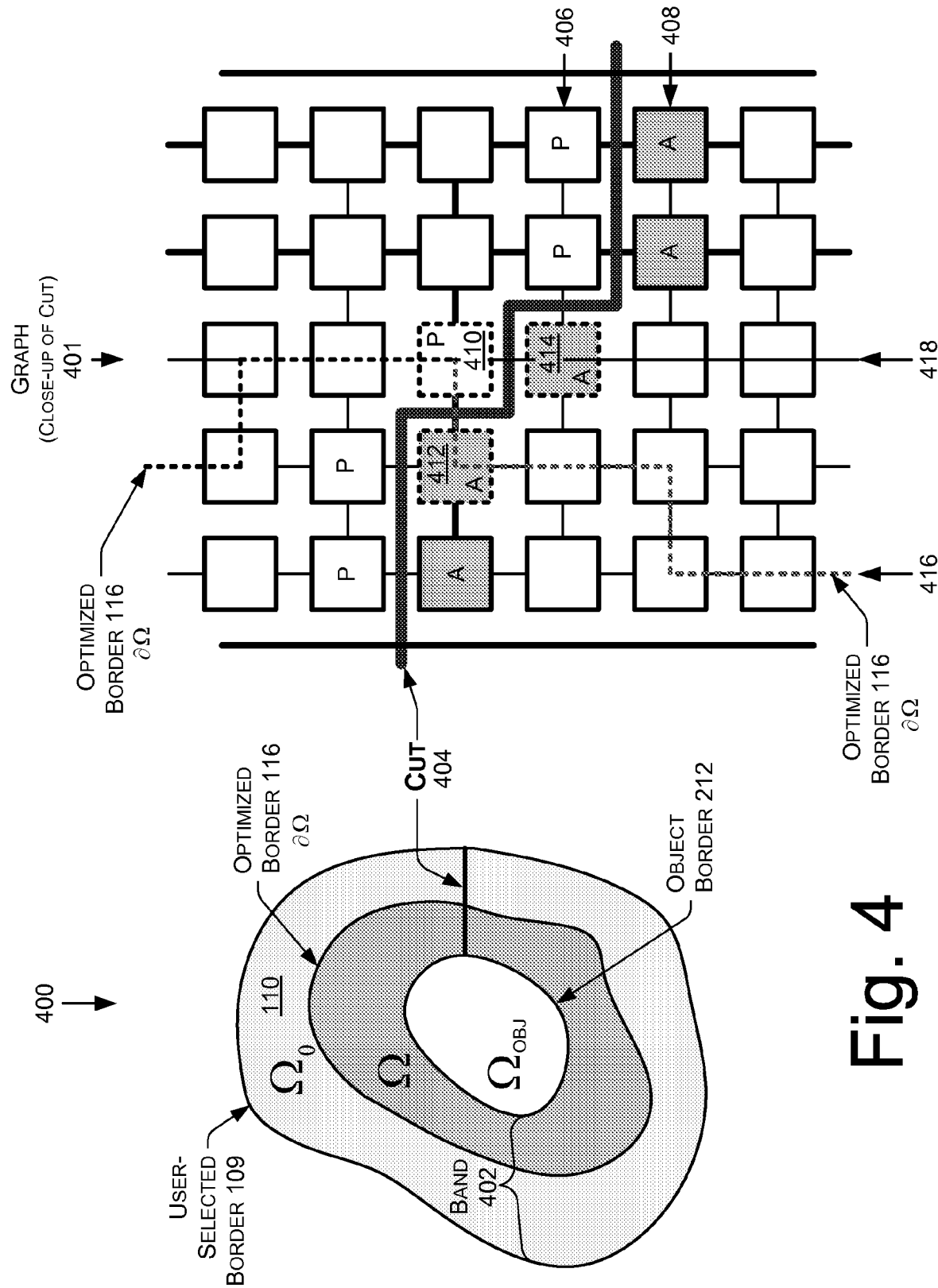
FIG. 4 is a diagram of exemplary boundary optimization using shortest path calculations.

FIG. 4 shows a diagram 400 of exemplary boundary optimization within the user-selected region of interest 110 and also shows a graph G 401 that represents a zoom-in of the optimal boundary 116 in part of the user-selected region 110. In FIG. 4(a), the region of interest $\Omega_0$ 110, which completely encloses the object of interest $\Omega_{obj}$, is to be pasted onto the target image 108. The optimized boundary $\partial \Omega$ 116 lies inside the band $\Omega_0 \backslash \Omega_{obj}$, i.e., the band of pixels ("band") 402 that lie between the outer border 109 of the user-selected region 110 and the outer border 212 of the visual object. A cut "C" 404 across the band 402 is shown in FIG. 4(a). FIG. 4(b) shows a zoom-in view of the cut 404. The "p" pixels and "a" pixels are on different sides of the cut 404. The dashed pixel "p" 410 is adjacent to two "a" pixels 412 & 414 on the other side of the cut 404. Two shortest path candidates, shown as dotted and solid lines 416 & 418, are computed.

Exemplary Path Energy Minimizer

The shortest path constituting the optimized boundary $\partial \Omega$ 116 should lie in-between selected region $\Omega_0$ 110 and object border $\Omega_{obj}$ 212. To reduce the color variance along the boundary, the path energy minimizer 222 minimizes the following objective function (or boundary energy) as shown in Equation (4):

$$E(\partial \Omega, k) = \sum_{p \in \partial \Omega} ((f_i(p) - f_s(p)) - k)^2, \ s.t. \ \Omega_{obj} \subset \Omega \subset \Omega_0, \quad (4)$$

where k is a constant value to be determined. In one implementation, the value of each color pixel f(p) is taken as a ternary set in {r, g, b} color space. The term (f(p)-f(q)) is computed as the L2-norm in color spaces. The term $((f_t(p)-f_s(p))-k)$ represents the color deviation of the boundary pixels with respect to k.

Since the optimal boundary 116 may pass through all pixels in $\Omega_0 \backslash \Omega_{obj}$, the task of simultaneously estimating the optimal k and the new boundary $\partial \Omega$ 116 is intractable. Thus, the iterative color smoothing engine 224 iteratively optimizes the optimal k and the new boundary $\partial \Omega$ 116, as follows.

1. Initialize a new region—band $\Omega$ 402 lying between the selected border 109 of the selected region 110 and the object's border 212—with initial values of the user-selected region $\Omega_0$ 110.

2. Given the tentative new boundary $\partial\Omega$ 116, the optimal k is computed by taking the derivative of Equation (4) and setting it to zero, as in Equation (5):

$$\frac{\partial E(\partial\Omega, k)}{\partial k} = 0 \qquad (5)$$

$$\Leftrightarrow k = \frac{1}{|\partial\Omega|} \sum_{p\in\partial\Omega} (f_i(p) - f_s(p)),$$

where $|\partial\Omega|$ is the length of the new boundary $\partial\Omega$ 116. So k is the average color difference on the boundary.

3. Given the current k, optimize the new boundary $\partial\Omega$ 116.

4. Repeat steps 2 and 3 until the energy of Equation (4) does not decrease in two successive iterations.

The convergence of the above steps is guaranteed in step 4 by constraining the energy defined in Equation (4) to be monotonically decreasing. In step 3, computing an optimal boundary is equivalent to finding a shortest path in a graph G 401 defined in $\Omega_0 \backslash \Omega_{obj}$ (the band $\Omega$ 402 between the user-defined border 109 and the object border 212).

Exemplary Shortest Closed-Path Engine

The nodes in graph G 401 are pixels within the band 402 while the edges represent 4-connectivity relationships between neighboring pixels. The cost $((f_i(p)-f_s(p))-k)^2$ is defined on each node as the color difference with respect to k. The accumulated cost of a path sums up the costs of all nodes on the path. For a single object, the estimated $\Omega_{obj}$ can be regarded as genus-0 region and $\Omega_0 \backslash \Omega_{obj}$ is of genus-1 type, as shown in FIG. 4(a).

Unlike a standard shortest path problem, the optimized boundary $\partial\Omega$ 116 is a closed curve fully enclosing $\Omega_{obj}$, which complicates the optimization. To make it tractable, the shortest path engine 226 first changes the type of region $\Omega_0 \backslash \Omega_{obj}$ from genus-1 to genus-0. The band cut engine 228 does this by breaking the band connectivity (breaking the ring-like continuity of the doughnut shaped band 402) using the cut 404 that transverses the band 402. In the corresponding representation in graph G 401, all edges crossing the cut 404 are then removed.

Then, in one implementation, the shortest path engine 226 computes the closed shortest-path using the 2-dimensional (2D) dynamic programming engine 230 and minimum cost evaluator 232, executing the following example process flow:

First, as shown in FIG. 4(b), for each pixel "p" 406 on one side of the cut C 404, the shortest paths to all adjacent pixels "a" 408 on the other side of the cut 404 are shown. Since graph G 401 is a 2-dimensional grid, computing the shortest path from any node to all others in the band can be achieved by 2D dynamic programming with a complexity O(N), where N is the number of pixels in the band 402. Among all the possible paths starting from pixel p 406, proceeding away from the cut 404, and proceeding around the band to end at the neighboring pixel a 408 on the other side of the cut, the optimal path for this one pair of pixels, Path(p), is the path with minimum cost. In FIG. 4(b), as introduced above, for two pixels 412 and 414 that are neighbors to p 410 in the image plane, their corresponding shortest paths are computed and shown as lines 416 and 418.

Next, the shortest path engine 226 repeats the previous computation for all pixels on the "p" (406) side of the cut 404, and obtains a set of paths "Path". The minimum cost evaluator 232 determines the optimized boundary $\partial\Omega$ 116 as the one that gives the globally minimum cost. In FIG. 4(b), path 416 happens to have the minimum cost, so this path becomes the optimal boundary 116. Suppose that there are M pixels on the "p" 406 side of the cut 404 in graph G 401, then the overall computational complexity is O(MN).

If the optimal boundary 116 passes the cut C 404 only once, then the shortest path engine 226 will reach the global minimum of the energy defined in Equation (4). Indeed, the path with the minimum accumulated cost seldom twists in various experimental runs.

The band cut engine 228 applies the cut 404 to intersect the band at two pixels on $\partial\Omega_0$—the user-selected border 109—and on the border of the object $\partial\Omega_{obj}$ 212, respectively. There are many possibilities for how it can be initialized. In one implementation, to achieve better performance, the band cut engine 228 computes a shortest straight line segment among all pixel pairs connecting the object's border $\partial\Omega_{obj}$ 212 and the user-selected border $\partial\Omega_0$ 109 by computing the Euclidian distance. This line segment is then rasterized into a pixel list in a 2D image plane. The cut 404 is drawn adjacent to the pixel list on any side. There are two benefits in computing the shortest cut 404. First, the short length reduces the probability that the optimal boundary passes the cut more than once. Second, with fewer pixels adjacent to the cut C 404, the value of M will be small, which speeds up the computation.

Exemplary Blended Guidance Engine

An optimized boundary condition reduces the variational energy in solving the Laplacian equations, and avoids unnatural blurring in the composite image 120. However, the optimized boundary 116 may intersect with an object that has a fractional boundary and break up subtle and fine details.

Figure 5:
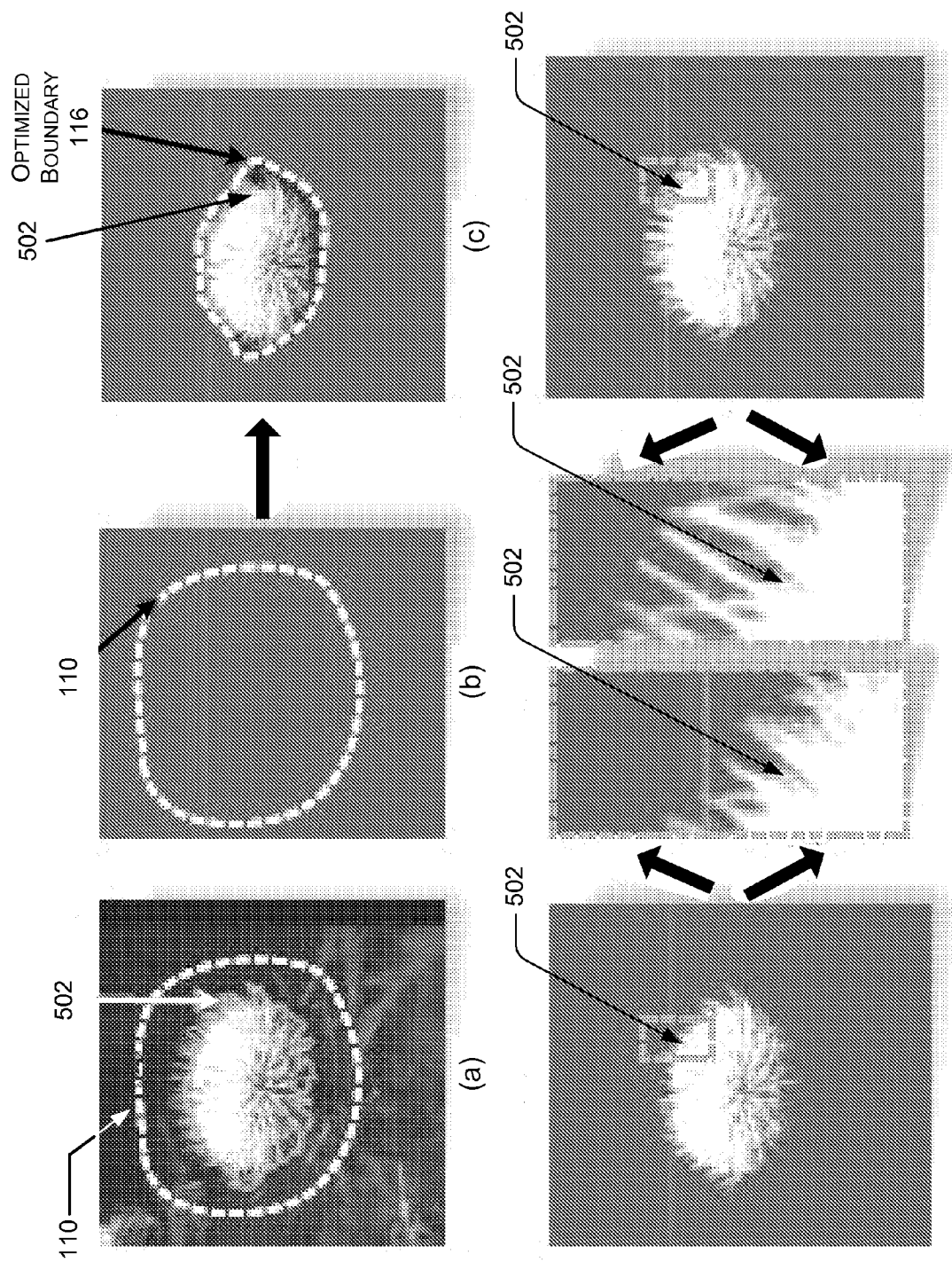
FIG. 5 is a diagram of exemplary fractional boundary preservation.

FIG. 5 shows exemplary preservation of an object's fractional boundary. Given the input source image of a flower in FIG. 5(a) and the target image 108 in FIG. 5(b), the optimized boundary $\partial\Omega$ 116 snaps closely to the top of the flower's silhouette $\partial\Omega_{obj}$, thus intersecting the fine details as shown in FIG. 5(c). Using only the optimized boundary 116 when solving the Poisson equation, as shown in FIG. 5(d), the fractional border 502 cannot be well-preserved as depicted in the zoom-in view in FIG. 5(e). To remedy this, the exemplary blended guidance engine 216 integrates the object's alpha matte into the Poisson equations, and faithfully preserves the fine details, thus producing an improved composite of the flower shown in FIG. 5(f). The corresponding zoom-in view is shown in FIG. 5(e).

Thus, FIG. 5 shows a scenario in which optimized boundary $\partial\Omega$ 116 is close to object border $\partial\Omega_{obj}$ 212 and breaks the hairy structures (shown in FIGS. 5(c) and 5(d)). To faithfully preserve the object's transparent, fractional boundary, the blended guidance engine 216 incorporates an alpha matte of the object in a blended guidance field 220 for the Poisson equations executed by the Poisson editor 218, by detecting the regions where alpha blending should be applied along the optimized boundary 116.

One goal of introducing such transparency is to preserve the fractional border 502 of the object when the object is composited onto the target image 108, while at the same time being able to blend the color of the object seamlessly with the target image 108. Conventional alpha blending techniques cannot modify the color of the source object. To combine alpha blending with Poisson image editing, the alpha matte integrator 242 creates a binary coverage mask M 246 to indicate where alpha blending should be applied (i.e., M(p)=1) and vice versa, which has the result of partitioning the image into regions. If the blending techniques were directly applied in separate regions, however, the pixels in adjacent region boundaries would have color discontinuities since they would be processed by two different methods without an appropriate spatial transition. To eliminate the artifact caused by this potential color discontinuity, the blended guidance engine 216 integrates the alpha matte into the blended guidance field 220 of the Poisson equations themselves.

Figure 6:
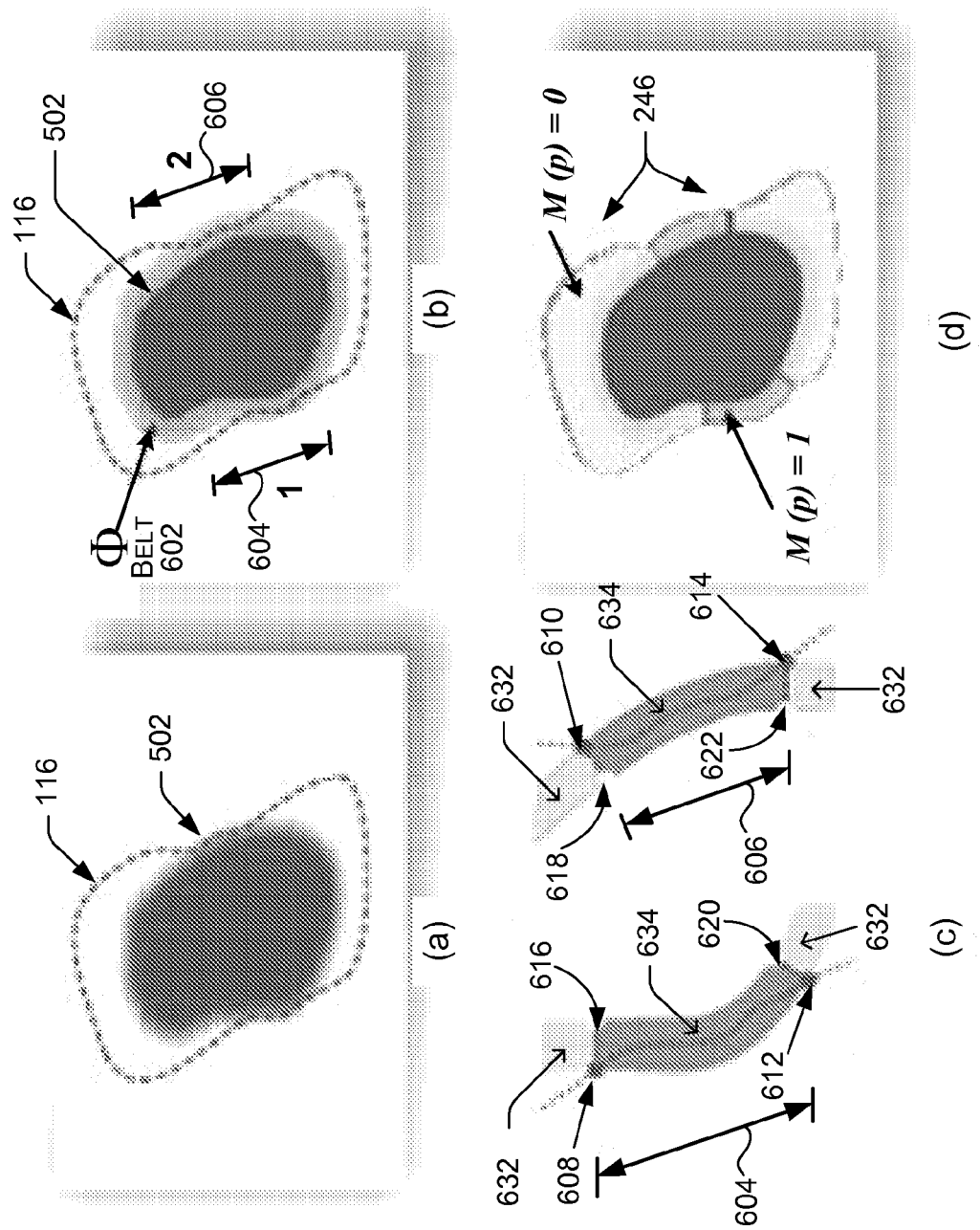
FIG. 6 is a diagram of exemplary binary coverage mask generation for selectively applying an object's alpha matte.

FIG. 6 shows construction of the exemplary binary coverage mask M 246. FIG. 6(*a*) shows a source object with fractional border 502 to be pasted onto a target image 108. The dashed curve is the optimized boundary ∂Ω 116. In FIG. 6(*b*), the belt 602 is a region that includes the object's fractional border 502, and this belt 602 is represented as Φ= {p|0<α(p)<1}. As indicated by arrows "1" 604 and "2" 606, the optimized boundary ∂Ω 116 penetrates into this belt 602 and the resulting segments where there is penetration are where matte compositing should be applied. FIG. 6(*c*) shows zoom-in views of segments "1" 604 and "2" 606, around which the region {p|M(p)=1} is computed. FIG. 6(*d*) shows the resulting binary coverage mask 246 where regions {p|M(p)=0} and {p|M(p)=1} reside.

As introduced above, the fractional border calculator 238 denotes the belt 602 as Φ={p|0<α(p)<1}, where α is computed automatically within a few pixels surrounding $\Omega_{obj}$ by the coherence matting engine 240. Compared to Bayesian matting, coherence matting has the formulation of the prior of the alpha value. In one implementation, the coherence matting engine 240 models coherence matting as a Gaussian distribution with respect to the median axis of Φ. In FIG. 6(*b*), Φ is of the shape of the illustrated narrow belt 602. The blended guidance field is v'=(v'$_x$, v'$_y$). For each pixel p=(x, y), and v'$_x$(x, y) is defined as in Equation (6):

$$v'_x(x, y) = \begin{cases} \nabla_x f_x(x, y) & M(x, y) = M(x+1, y) = 0 \\ \nabla_x (\alpha f_s + (1-\alpha)f_t) & M(x, y) = M(x+1, y) = 1 \\ 0 & M(x, y) \neq M(x+1, y) \end{cases} \quad (6)$$

Likewise, v'$_y$(x, y) is defined in a similar way. This demonstrates that, depending on whether the alpha matte is applied, v'$_x$(x, y) is defined either as the alpha blended gradient in regions where M=1 or as the source image gradient in regions where M=0. However, in between these two regions, the gradient has no exact definition in image space. So the color continuity engine 236 assigns a value of zero to these pixel gradients to smoothly fuse the two regions and eliminate color discontinuity.

Given the new blended guidance field 220, the following variational energy represented in Equation (7) is minimized:

$$\underset{f}{\mathrm{argmin}} \int_{p \in \Omega \cup \Phi} \|\nabla f - v'\|^2 dp \quad (7)$$

with $$f|_{\partial(\Omega \cup \Phi)} = f_t|_{\partial(\Omega \cup \Phi)}.$$

where Ω∪Φ includes pixels either within the optimized boundary 116 or inside the fractional border 502, and ∂(Ω∪Φ) is the exterior boundary of Ω∪Φ.

Then, to solve the boundary problem depicted in FIG. 5, the alpha blending assignor 244 constructs the binary coverage mask M 246 within Ω∪Φ before solving Equation (7). Considering the pixels inside the object where α(p)=1, the guidance field v' is consistently f$_s$ regardless of the values of M(p). Therefore, M does not need to be computed for these pixels.

As mentioned above, FIG. 6 illustrates how the alpha blending assignor 244 estimates M 246. In FIGS. 6(*a*) and 6(*b*), the optimal boundary ∂Ω 116 penetrates into the fractional border 502 in two segments, segment "1" 604 and segment "2" 606, where some pixels with fractional alpha value are left outside the band Ω 402 enclosed by the optimized boundary 116. This also breaks the structure of the object boundary 212. Around segments "1" 604 and "2" 606, matte compositing is applied in the blended guidance field 220 and M is set to 1. The following lists main steps for constructing an implementation of the binary coverage mask M 246:

First, head and tail intersections, that is, beginning intersections 608 & 610 and ending intersections 612 & 614 between the optimized boundary ∂Ω 116 and the belt Φ 602, are computed. These intersections define the start and finish of each segment (604 & 606) where the optimized boundary 116 impinges on the belt 602 enveloping the object's fractional border 502.

To obtain a region where alpha blending should be applied, the nearest points (i.e., 616, 618, 620, 622) on the other (inside) side of the belt Φ 602 are computed, and then the corresponding points are connected by straight lines. Thus, in FIG. 6(*c*), the belt Φ 602 is partitioned into a first type of region 632 and a second type of region 634. The regions representing the segments 604 & 606 are set as {p|M(p)=1}, and the remaining pixels in the belt 602 are set as M(p)=0 for the remaining pixels p in the belt 602.

Variations

In one implementation, the object border segmenter 210 uses GRABCUT and image matting techniques to automatically compute $\Omega_{obj}$ and α, respectively. The alpha matte is only used in the region of the fractional border 502 where M=1 as described above. Therefore, precise alpha values for all pixels are not required. In case that the automatically computed $\Omega_{obj}$ and α contain large error, in some implementations user interactions are allowed to refine the values.

Exemplary Methods

Figure 7:
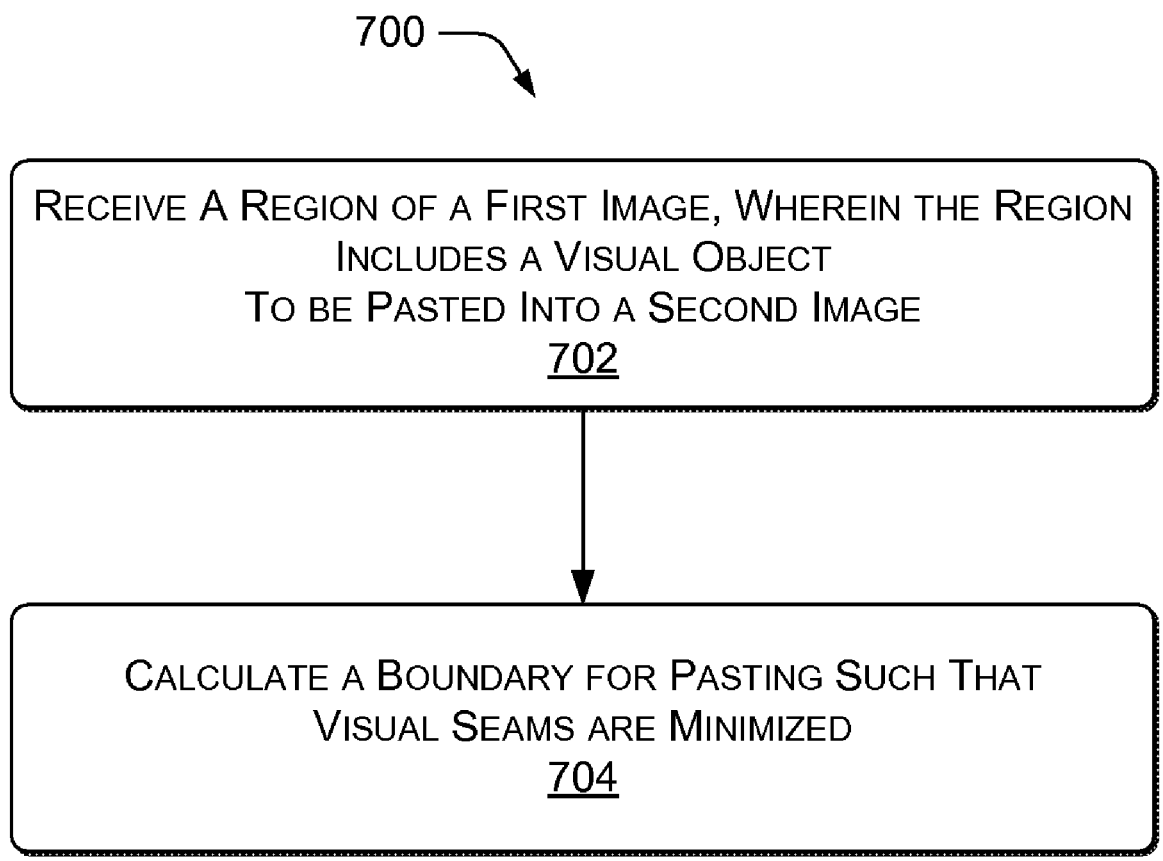
FIG. 7 is a flow diagram of an exemplary method of pasting a visual object.

FIG. 7 shows an exemplary method 700 of pasting a visual object. In the flow diagram, the operations are summarized in individual blocks. The exemplary method 700 may be performed by hardware, software, or combinations of hardware, software, firmware, etc., for example, by components of the exemplary image compositor 104.

At block 702, a region of a first image that includes a visual object to be pasted into a second image is received. The region is casually selected by a user, for instance, by drawing a crude circle around a visual object that the user desires to paste into a second image. Thus, the region selected by the user includes an object that the user wants to paste into a second image at a particular location, but also includes some extraneous part of the first image. This exemplary selection of the region to be pasted stands in contrast to convention Poisson image editing, in which the user must painstakingly designate the accurate border of the object to be pasted.

At block 704, a boundary for pasting is automatically calculated that minimizes visual seams in the composite image. Rather than just paste the entire user-selected region into the target image, which at best would leave numerous visible seams, and at worst would wipe out detail and structure in the target image being pasted over by the user-selected region, the exemplary method 700 calculates an optimal boundary for pasting. The optimal boundary automatically avoids structure in the target image and also follows a path around the visual object to be pasted in which color variance is at a minimum, in order to minimize visual seams in the final, composite image.

Figure 8:
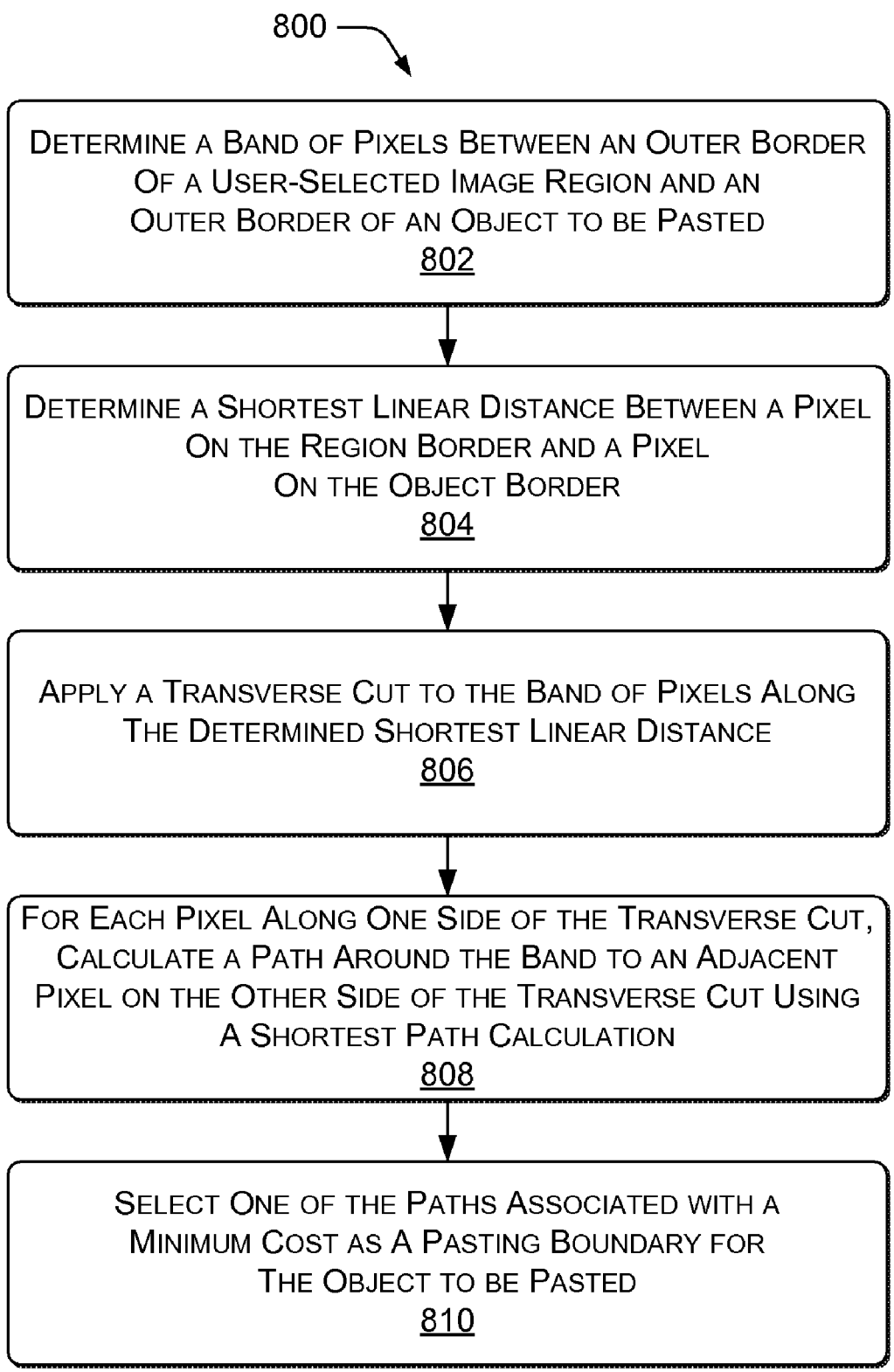
FIG. 8 is a flow diagram of an exemplary method of performing shortest path calculations to optimize a boundary for pasting with reduced visual seams.

FIG. 8 shows an exemplary method 800 of performing shortest path calculations to optimize a boundary for pasting with reduced visual seams. In the flow diagram, the operations are summarized in individual blocks. The exemplary method 800 may be performed by hardware, software, or combinations of hardware, software, firmware, etc., for example, by components of the exemplary image compositor 104.

At block 802, a band of pixels is determined, the band lying between an outer border of a user-selected image region and an outer border of an object residing within the user-selected image region. The band of pixels is the region of pixels casually selected by the user minus a doughnut-hole where the object to be pasted resides. Again, the band is the extraneous part of the source image around the object to be pasted, inside the region that the user has crudely designated as containing the object to be pasted.

At block 804, a shortest linear distance is determined between a pixel on the outer border of the user-selected region and a pixel on the object's outer border. That is, a shortest transverse cut is calculated that breaks the band of pixels at its narrowest point between inside diameter and outside diameter—i.e., that makes an "o" shape of the band into a "c" shape. The shortest cut can be calculated by classical Euclidean techniques.

At block 806, the calculated cut is applied to the band, along the determined shortest linear distance. The resulting "broken band" can then be processes as a graph, with the nodes of the graph representing pixels. Graph edges across the cut are discarded. This leaves a broken band with pixels lining each side of the cut.

At block 808, for each pixel along one side of the cut, a shortest path is calculated around the band to a pixel that is adjacent to the starting pixel, but on the other side of the cut. That is, each path is calculated from one side of the cut to the other, around the band. The shortest path is reckoned as the path that encounters the least color variation along its length (not necessarily the shortest distance). Each pixel on one side of the cut may have several adjacent pixels on the other side of the cut. Thus, numerous paths are calculated, i.e., multiple paths are calculated for each pixel on one side of the cut, since each of the pixels may have several adjacent pixels on the other side of the cut. Each candidate path is associated with a cost that is higher in relation to the amount of color variation that a particular path encounters along its length.

At block 810, one of the paths associated with the minimum cost is selected as the boundary for pasting. That is, of the many candidate paths, the path that encounters the least color variation is likely to avoid the most structure and detail in the target image and is likely to provide the most seamless color blending between source and target images. Poisson image editing is applied across the selected boundary. If the object to be pasted has a border with fine structure, and the boundary intersects the fine structure, then the Poisson editing is subject to a guidance field that protects the fine structure by integrating the object's alpha matte in the Poisson equations.

CONCLUSION

Although exemplary systems and methods have been described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A computer-implemented drag-and-drop pasting method of seamless image composition, the method comprising:
   receiving, by one or more computing devices configured to facilitate seamless image composition, a region of a first image, the region including a visual object to be pasted into a second image; and
   calculating, by the one or more computing devices, a boundary for pasting such that visual seams are minimized, wherein the calculating of the boundary further comprises iteratively determining a minimal color difference between a plurality of pixels in each path of a plurality of paths via performing a shortest closed path calculation, wherein performing the shortest closed path calculation comprises:
      determining a band of pixels between a user-selected border of the region of the first image and a border of the visual object;
      determining a shortest linear distance between a point on the user-selected border of the region of the first image and a point on the border of the visual object;
      applying a transverse cut to the band of pixels along the determined shortest linear distance;
      using the shortest closed path calculation, calculating at least one path of the plurality of paths associated with a minimum cost around the band from at least one pixel of the plurality of pixels along one side of the transverse cut to an adjacent pixel on the other side of the transverse cut; and
      selecting the at least one path associated with the minimum cost as the boundary, wherein the minimum cost is determined based on a least color variation along the at least one path of the plurality of paths.

2. The method as recited in claim 1, wherein receiving the region includes receiving an arbitrary border that envelops the region, wherein the arbitrary border is selected by a user.

3. The method as recited in claim 1, wherein calculating the boundary condition includes avoiding visual structure in the first and second images.

4. The method as recited in claim 3, wherein calculating the boundary condition includes minimizing a boundary energy function to find a path of pixels in the region, the path surrounding the visual object and having a lowest energy with respect to color differences between pixels in the path as compared with other potential paths in the region.

5. The method as recited in claim 1, further comprising pasting the visual object into the second image via Poisson editing at the boundary, wherein the pasting further includes controlling the Poisson editing with a guidance field for determining where along the border of the visual object to apply alpha blending to protect a fine visual structure of the border of the visual object when the visual object is relatively thin or when the visual object has a fractional border.

6. The method as recited in claim 5, further comprising calculating dimensions of the fractional border by applying coherence matting.

7. The method as recited in claim 6, further comprising calculating a binary coverage mask to integrate the alpha blending with the Poisson editing via the guidance field, wherein the binary coverage mask indicates where to apply the alpha blending to protect the fine structure of the fractional border of the visual object.

8. The method as recited in claim 7, further comprising smoothing colors between first parts of the fractional border to which the alpha blending is applied and second parts of the fractional border to which the alpha blending is not applied.

9. An apparatus, comprising:
a user interface configured to select an arbitrary border around a region of a first image, the region including a visual object to be pasted from the first image into a second image;
a boundary condition optimizer configured to calculate a boundary around the visual object and iteratively determine a minimal color difference between pixels via a shortest closed path calculation, wherein the boundary minimizes visual seams when the visual object is pasted into the second image; and
a shortest path engine configured to compute a shortest path about the visual object using a minimum cost evaluator, the minimum cost evaluator configured to determine an optimized boundary having a minimum cost indicative of at least one color variation among pixels along a length of the shortest path.

10. The apparatus as recited in claim 9, wherein the boundary condition optimizer includes a boundary energy minimizer configured to locate the boundary along a path of pixels that have a relatively small energy difference from each other.

11. The apparatus as recited in claim 9, wherein the boundary condition optimizer being further configured to calculate a boundary condition that avoids visual structure in the first and second images and minimizes color differences along the boundary.

12. The apparatus as recited in claim 9, further comprising a Poisson editor configured to paste the visual object into the second image via Poisson editing at the boundary.

13. The apparatus as recited in claim 12, further comprising a blended guidance engine configured to control the Poisson editing with a guidance field for determining where along the border of the visual object to apply alpha blending, wherein the alpha blending protects a fine visual structure of the border of the visual object when the visual object is relatively thin or when the visual object has a fractional border.

14. The apparatus as recited in claim 13, further comprising a fractional border calculator configured to calculate dimensions of the fractional border by applying coherence matting.

15. The apparatus as recited in claim 14, further comprising an alpha matte integrator configured to calculate a binary coverage mask to integrate the alpha blending with the Poisson editing via the guidance field, wherein the binary coverage mask indicates where to apply the alpha blending to protect the fine structure of the fractional border of the visual object.

16. The apparatus as recited in claim 15, further comprising a color continuity engine configured to smooth colors between first parts of the fractional border to which the alpha blending is applied and second parts of the fractional border to which the alpha blending is not applied.

17. A system comprising:
a computing device comprising an image compositor, the image compositor configured to optimize a boundary condition to find an optimal fusion boundary between a target image border enveloped by the optimal boundary condition and a user-selected region, the image compositor comprising:
a boundary condition optimizer configured to execute an objective function by iterating a shortest closed-path technique, the boundary condition optimizer comprising:
a path energy minimizer configured to search for an optimal boundary path in between the user-selected region and the target image border, the path energy minimizer comprising:
a shortest path engine configured to compute a shortest path using a minimum cost evaluator, the minimum cost evaluator configured to determine an optimized boundary having a minimum cost indicative of at least one color variation among pixels along a length of the shortest path.

18. The apparatus as recited in claim 9, wherein the boundary condition optimizer determines an optimized boundary between the selected arbitrary border around the region of the first image and the border of the visual object.

* * * * *